(12) United States Patent
Bansal et al.

(10) Patent No.: US 12,501,257 B2
(45) Date of Patent: Dec. 16, 2025

(54) METHODS AND SYSTEMS FOR ENHANCED CONFIGURATION AND CONTROL IN ULTRA-WIDEBAND (UWB) SYSTEMS

(71) Applicant: Samsung Electronics Co., Ltd., Gyeonggi-do (KR)

(72) Inventors: Ankur Bansal, Bangalore (IN); Aniruddh Rao Kabbinale, Bangalore (IN); Karthik Srinivasa Gopalan, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 473 days.

(21) Appl. No.: 17/875,883

(22) Filed: Jul. 28, 2022

(65) Prior Publication Data
US 2023/0039287 A1    Feb. 9, 2023

(30) Foreign Application Priority Data

Jul. 28, 2021  (IN) .............................. 202141033949
Jul. 20, 2022  (IN) .............................. 202141033949

(51) Int. Cl.
*H04W 8/26* (2009.01)
*H04W 8/00* (2009.01)
*H04W 76/10* (2018.01)

(52) U.S. Cl.
CPC ........... *H04W 8/265* (2013.01); *H04W 8/005* (2013.01); *H04W 76/10* (2018.02)

(58) Field of Classification Search
None
See application file for complete search history.

(56) References Cited

U.S. PATENT DOCUMENTS

| | | |
|---|---|---|
| 8,625,801 B2 | 1/2014 | Hu et al. |
| 2007/0242729 A1 | 10/2007 | Quinn et al. |
| 2014/0342670 A1 | 11/2014 | Kang et al. |
| 2015/0264724 A1 | 9/2015 | Yao |
| 2017/0279496 A1 | 9/2017 | Schultz et al. |
| 2018/0062781 A1* | 3/2018 | Ly .................... H04W 48/10 |

(Continued)

FOREIGN PATENT DOCUMENTS

| | | | |
|---|---|---|---|
| KR | 1020140135569 | 11/2014 | |
| KR | 10-2022666 | 9/2019 | |
| WO | WO-2021194347 A1 * | 9/2021 | .............. H04W 4/90 |

OTHER PUBLICATIONS

International Search Report dated Nov. 14, 2022 issued in counterpart application No. PCT/KR2022/011082, 9 pages.

(Continued)

*Primary Examiner* — Walter J Divito
(74) *Attorney, Agent, or Firm* — The Farrell Law Firm, P.C.

(57) ABSTRACT

Methods and systems are provided for handling communication in ultra-wideband (UWB) system. A first electronic device discovers at least one second electronic device to be on-boarded. The method and system perform at least one of determining, by the first electronic device, that the at least one discovered second electronic device is within an on-boarding range, and configuring information to the at least one discovered second electronic device by a connectionless message. The first electronic device establishes the communication with the at least one discovered second electronic device in the UWB system.

20 Claims, 13 Drawing Sheets

(56) References Cited

U.S. PATENT DOCUMENTS

2020/0336897 A1 10/2020 Ledvina et al.
2020/0383157 A1 12/2020 Lee et al.

OTHER PUBLICATIONS

Indian Examination Report dated Mar. 3, 2023 issued in counterpart application No. 202141033949, 5 pages.
European Search Report dated Oct. 2, 2024 issued in counterpart application No. 22849890.3-1215, 9 pages.
Korean Office Action dated May 29, 2025 issued in counterpart application No. 10-2024-7006729, 21 pages.

* cited by examiner

METHODS AND SYSTEMS FOR ENHANCED CONFIGURATION AND CONTROL IN ULTRA-WIDEBAND (UWB) SYSTEMS

CROSS REFERENCE TO RELATED APPLICATIONS

This application is based on and claims priority under 35 U.S.C. § 119 to Indian Provisional Patent Application Serial No. 202141033949, filed on Jul. 28, 2021, in the Indian Patent Office, and to Indian Complete Patent Application Serial No. 202141033949, filed on Jul. 20, 2022, in the Indian Patent Office, the entire disclosure of each of which is incorporated herein by reference.

BACKGROUND

1. Field

The disclosure relates generally to ultra-wideband (UWB) systems, and more particularly, to methods and systems for enhanced configuration and control in the UWB systems.

2. Description of Related Art

Processes for identifying devices (e.g., electronic devices) to be on-boarded involve manually identifying the devices. This may involve, for example, checking the serial number on a packaging box of the device or a serial number printed on the device itself, and then manually checking that serial number against a list of discovered devices on a user device interface. The devices can be identified by manually scanning the device for a quick response (QR) code, for example. Manual interventions can be confusing and error-prone.

Many devices on-board wirelessly (i.e., using radio frequency (RF) communication). One way in which devices may be on-boarded, is that, when devices are initially taken out of the box, they are manually or automatically placed in an on-boarding state. The new device broadcasts over RF communication that its available to be on-boarded, enabling the user to connect to it via another user device and start the on-boarding process. However, RF range is generally quite large, and it can be discoverable from outside the home in a smart home scenario, for example. Accordingly, on-boarding of the new device needs to be prevented from another device that is within RF range, but is beyond a physical proximity of the new device.

FIG. 1 is a diagram illustrating a manual on-boarding process. At 101, a new device 100B advertises a message. At 102 and at 103, a current device 100A discovers the new device 100B based on the message. At 104, the current device 100A manually finds the device to be on-boarded (e.g., identify the device by checking the discovered device name against the serial number/ID on a packaging box). At 105, the current device 100A manually scans the QR code. If other methods of on-boarding over the connectivity technologies is done, there is no way of ensuring user proximity. At 106, the user of the current device 100A is initiates the connection with the new device 100B. At 107, the current device (100A) on-boards the device using the provision security key.

FIG. 2 is a diagram illustrating a process of on-boarding a device to a network. First, the device to be on-boarded is identified using the UWB. For example, the user with a UWB enabled phone may want to on-board a new TV at home. The user has multiple UWB enabled devices at home. For on-boarding, the user needs a way to identify the device that needs to be on boarded. This identification may happen with the scanning of a QR code. However, this is not very intuitive and can ruin the user experience. The range of wireless home networks is about 50-80 meters. This creates a vulnerability of an unknown user pairing and starting on-boarding of your new device.

During on-boarding/configuration using connectionless transfer of information, advertisement messages are sent un-encrypted leading to security/privacy issues.

Further, the on-boarding process can be performed one device at a time, and cannot be performed for multiple devices at a time. Post on-boarding, privacy needs to be ensured.

Further, new devices need to be prevented from connecting to existing RF network/router, if the new device is beyond the physical distance of existing RF network/router.

On-boarding may require many manual steps with user intervention, and is not intuitive or easily achieved. Additionally, there is no mechanism defined for on-boarding devices using UWB. Further, there are no mechanisms defined for parallel on-boarding of devices and for parallel configuration of devices.

SUMMARY

An aspect of the disclosure provides methods and systems for enhanced configuration and control in UWB systems by enabling seamless on-boarding of devices using UWB ranging to intuitively identify the device to be on-boarded, optimize on-boarding and configuration of devices, perform secure on-boarding by ensuring devices involved in on-boarding are within threshold distance/angle to prevent malicious devices from connecting to the new device, and enable secure connection of the new device onto the existing network.

Another aspect of the disclosure provides methods and systems for enhanced configuration and control in UWB systems, where on-boarding and configuration of devices is optimized by including a connectionless transfer of information.

Another aspect of the disclosure ensures security/privacy through protected advertisement of information/data, if the connection is a connectionless communication.

Another aspect of the disclosure performs secure on-boarding by ensuring devices involved in on-boarding are within a threshold distance/angle to prevent malicious devices from connecting to the new device.

Another aspect of the disclosure provides methods and systems for performing automated on-boarding of multiple devices in parallel.

According to an aspect of the disclosure, a method is provided for handling communication in an UWB system. A first electronic device discovers at least one second electronic device to be on-boarded. Further, the method includes performing at least one of: determining, by the first electronic device, that the at least one discovered second electronic device is within an on-boarding range, and configuring information to the at least one discovered second electronic device by a connectionless message. The first electronic device establishes the communication with the at least one discovered second electronic device in the UWB system.

According to an aspect of the disclosure, a method is provided for handling communication in an UWB system. A first electronic device receives broadcasted information required to initiate a UWB ranging with at least one second electronic device. The first electronic device processes the broadcasted information to establish the communication with the at least one second electronic device in the UWB system.

According to an aspect of the disclosure, a first electronic device is provided for handling communication in an UWB system. The first electronic device includes a UWB communication controller coupled with a processor and a memory. The UWB communication controller is configured to discover at least one second electronic device to be on-boarded. Further, the UWB communication controller is configured to perform at least one of determining that the at least one discovered second electronic device is within an on-boarding range and configuring information to the at least one discovered second electronic device by a connectionless message. Further, the UWB communication controller is configured to establish the communication with the at least one discovered second electronic device in the UWB system.

According to an aspect of the disclosure, a first electronic device is provided for handling communication in an UWB system. The first electronic device includes a UWB communication controller coupled with a processor and a memory. The UWB communication controller is configured to receive broadcasted information required to initiate a UWB ranging with at least one second electronic device. Further, the UWB communication controller is configured to process the broadcasted information to establish the communication with the at least one second electronic device in the UWB system based on the broadcasted information.

According to an aspect of the disclosure, a method is provided for handling communication in an UWB system. At least one second electronic device sends broadcasted information required to initiate a UWB ranging with a first electronic device. The first electronic device receives the broadcasted information required to initiate the UWB ranging with the at least one second electronic device. The first electronic device processes the broadcasted information to establish the communication with the at least one second electronic device in the UWB system.

According to an aspect of the disclosure, a UWB system is provided that includes a first electronic device and at least one second electronic device. The at least one second electronic device is configured to send broadcasted information required to initiate a UWB ranging with the first electronic device. The first electronic device is configured to receive the broadcasted information required to initiate the UWB ranging with the at least one second electronic device and process the broadcasted information to establish the communication with the at least one second electronic device in the UWB system.

BRIEF DESCRIPTION OF THE DRAWINGS

The above and other aspects, features, and advantages of the disclosure will be more apparent from the following description taken in conjunction with the accompanying drawings, in which.

DETAILED DESCRIPTION

Figure 1:
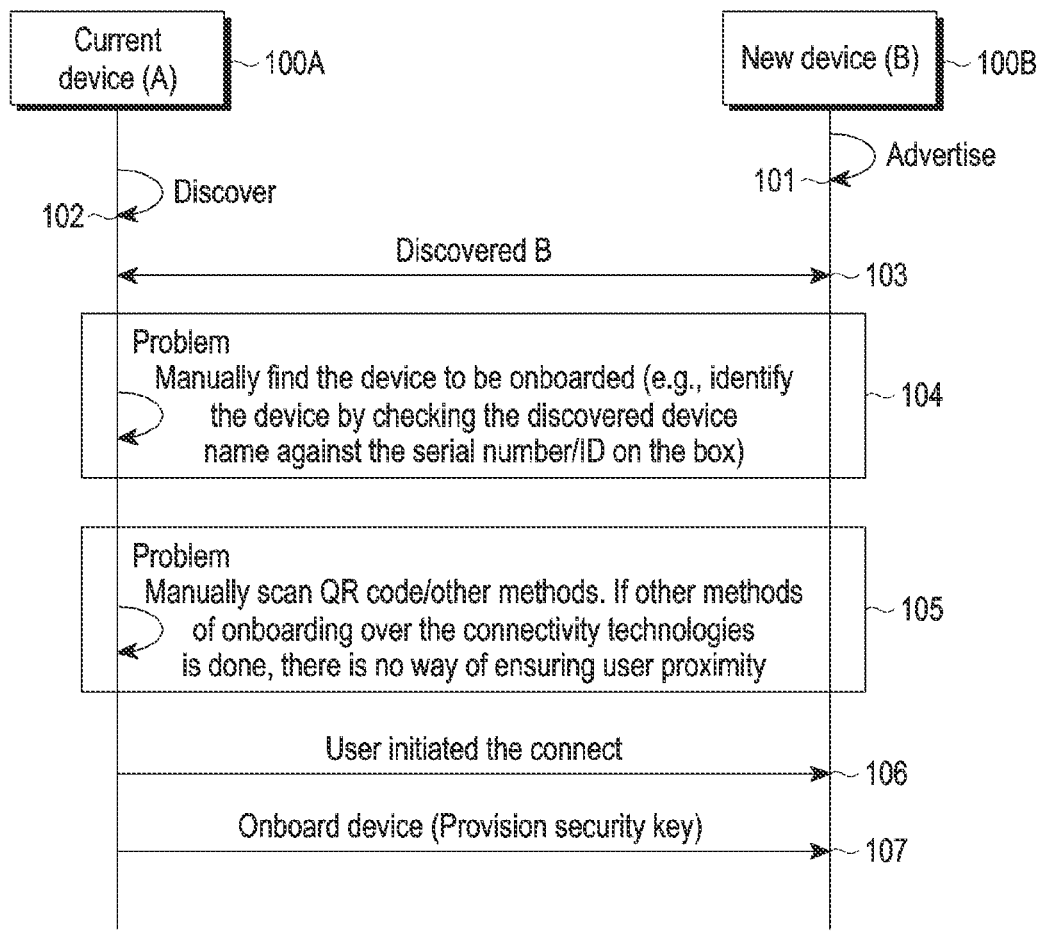
FIG. 1 is a diagram illustrating a manual on-boarding process.
Figure 2:
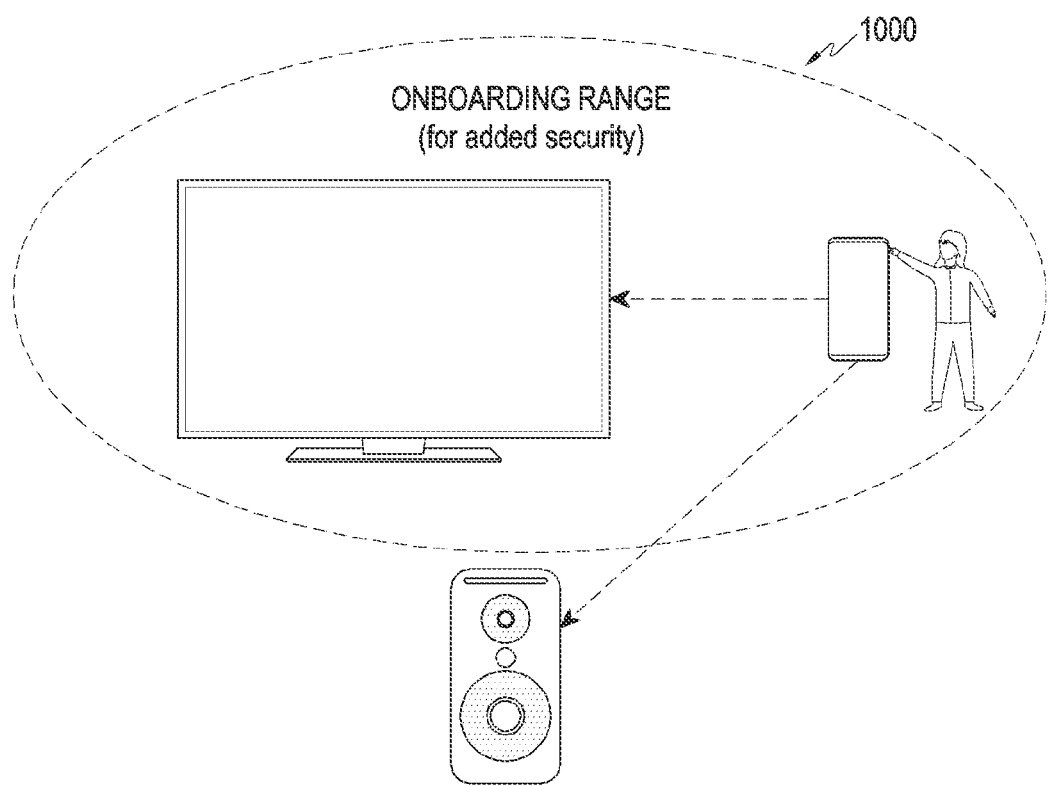
FIG. 2 is a diagram illustrating a process of on-boarding a device to a network.

Embodiments of the disclosure are described in detail with reference to the accompanying drawings. It should be noted that the same or similar components may be designated by the same or similar reference numerals although they are illustrated in different drawings. Detailed descriptions of constructions or processes known in the art may be omitted to avoid obscuring the subject matter of the disclosure.

The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods and systems for handling communication in an UWB system. The method includes discovering, by a first electronic device, at least one second electronic device to be on-boarded. Further, the method includes performing, by the first electronic device, at least one of determining that the at least one discovered second electronic device is within an on-boarding range and configuring information to the at least one discovered second electronic device by a connectionless message. Further, the method includes establishing, by the first electronic device, the communication with the at least one discovered second electronic device in the UWB system.

The method provides the enhanced configuration and control in UWB systems by enabling seamless on-boarding of devices using UWB ranging to intuitively identify the device to be on-boarded. The method can be used to optimize on-boarding and configuration of devices, perform secure on-boarding by ensuring devices involved in on-boarding are within threshold distance/angle to prevent malicious devices from connecting to the new device, and enable secure connection of the new device onto the existing network. The on-boarding and configuration of devices is optimized by including a connectionless transfer of information.

The method can be used to ensure security/privacy through protected advertisement of information/data, if the connection is a connectionless communication. The method can be used to perform secure on-boarding by ensuring devices involved in on-boarding are within a threshold distance/angle to prevent malicious devices from connecting to the new device. The methods can be used for performing automated on-boarding of multiple devices in parallel.

Figure 3:
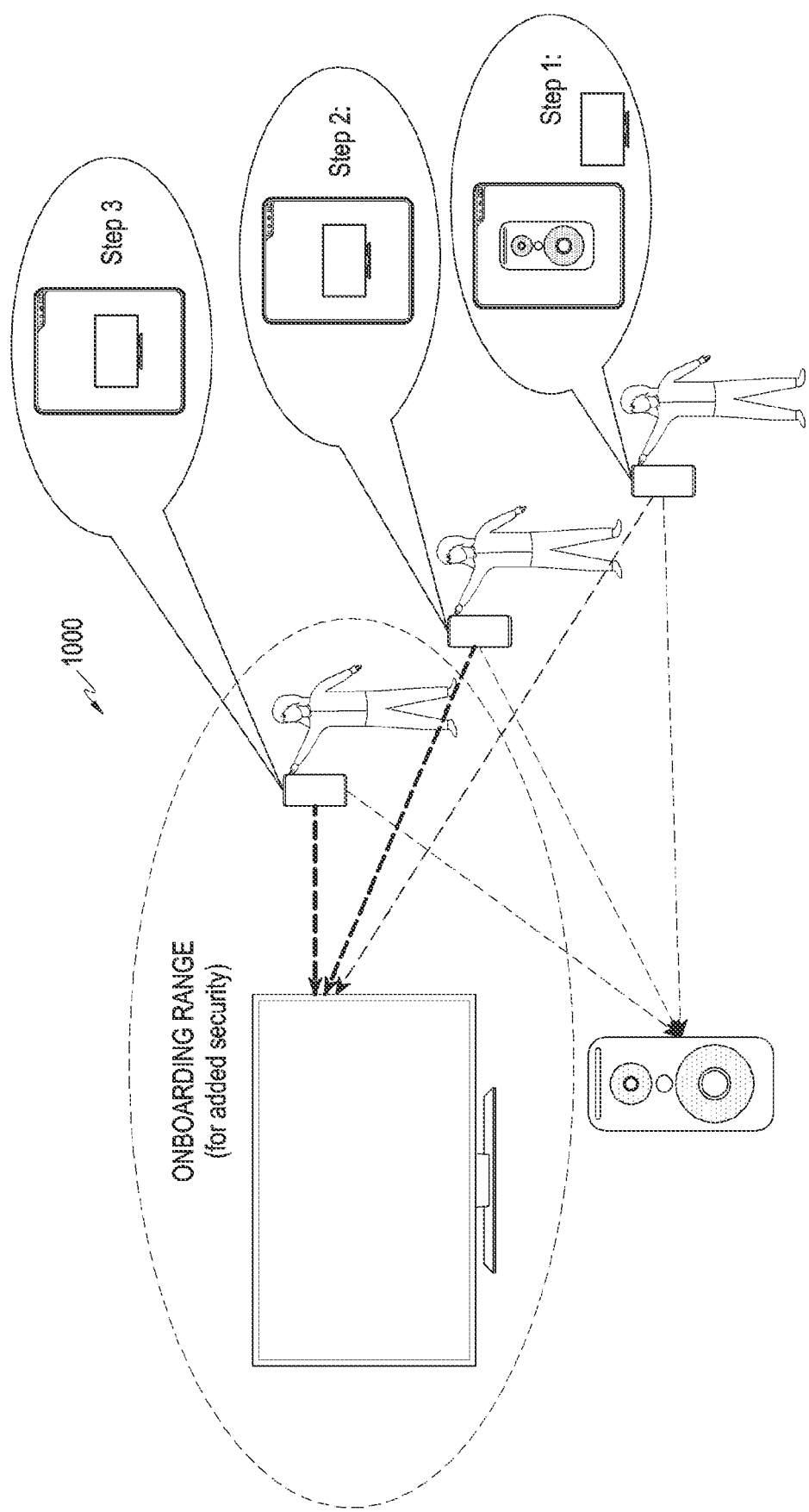
FIG. 3 is a diagram illustrating a process of on-boarding a device to a network, according to an embodiment.

FIG. 3 is a diagram illustrating a process of on-boarding a device to a network, according to an embodiment. In a first step, the devices are discovered. In a second step, the device to be on-boarded, which is not yet in an on-boarding range, is identified intuitively (e.g., by pointing to the device to be on-boarded) on-board. In a third step, the identified device is on-boarded, once the device is in on-boarding range.

Embodiments herein allow connectionless UWB configuration. Information required to initiate the UWB ranging is advertised/broadcasted from device 1 (e.g., a phone). The intended target device 2 (e.g., a smart TV), only receives this message. There is no information sent back from device 2 to device 1. The configuration might include all parameters or it might have an ID of a predefined configuration. As the advertisement information is broadcasted, this advertisement information may be encrypted before transmission. This allows for only an authorized device to decrypt and use the information. Also, the medium access control (MAC) address in the header of the advertisement data is encrypted to ensure privacy.

Before on-boarding, the manufacturer/vendor may pre-provision some keys/credentials/cryptographic material/certificates in the device to ensure that the initial transmissions are secure. The UWB ranging is performed to detect the distance and direction of the device, and to assist the user in identifying device being on-boarded.

During on-boarding, a secure channel is established between the devices. The keys/credentials/cryptographic material/certificates for establishing a secure channel to be used for further communication are provisioned. Keys/credentials/cryptographic material/certificates for encrypting advertisement data is provisioned. This overrides the manufacturer defined information with user-defined information. A pre-defined configuration is saved.

Post on-boarding, keys provisioned during on-boarding are used to encrypt advertisement data. Also, a MAC address in the header of advertisement data is encrypted to ensure privacy. This data exchange may be performed in-band, out-of-band, or in a combination of in-band and out-of-band.

First, the device to be on-boarded is identified using UWB. For example, a user with a UWB enabled phone may want to on-board a new TV at home. The user has multiple UWB enabled devices at home. For on-boarding, the user needs a way to identify which device needs to be on boarded. Embodiments herein provide the user with a more intuitive way to on-board the device. For example, the user may point the phone towards the TV that needs to be on-boarded and get started with on-boarding. This can be enabled using UWB to identify the device to be on-boarded. The user ranges with all UWB enabled devices in vicinity and based on a criteria (e.g., the device to which user is pointing to), the device to be on-boarded is identified. Before the on-boarding step, the on-boarding needs to be secured. To secure the on-boarding, embodiments herein restrict the on-boarding to happen only when the user device is within a threshold distance/angle (for example, 2 or 3 meters distance and is in front of the TV) from the device to be on-boarded. Embodiments herein can use the UWB ranging measurements (distance and angle) to determine whether the user's phone is within the defined threshold.

Figure 4:
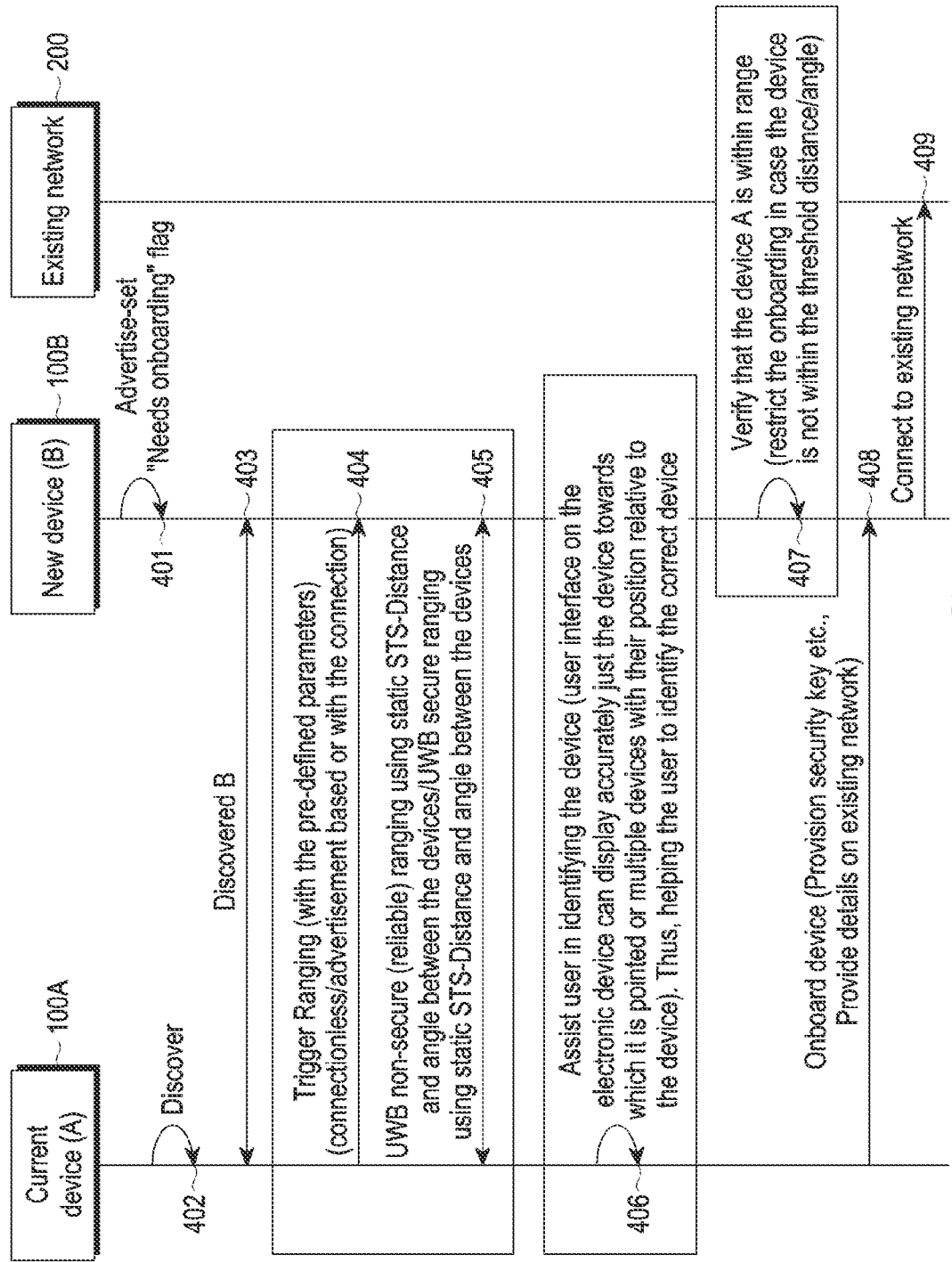
FIG. 4 is a diagram illustrating a process of on-boarding a new device, according to an embodiment.

FIG. 4 is a diagram illustrating a process of on-boarding a new device, according to an embodiment. The new device 100B is to be on-boarded by the current device 100A to an existing network 200. At 401, the new device 100B advertises, and the advertisement includes a 'needs on-boarding' flag that is set. At 402 and 403, the current device 100A performs a discovery procedure and discovers the new device 100B. The current device 100A performs ranging based device identification an performs secure on-boarding through user/device proximity detection. At 404, the current device 100A triggers ranging with the new device 100 B using one or more pre-defined parameters or using all the parameters (which can be connectionless/advertisement based or with a connection). At 405, the current device 100A may perform the UWB non-secure (reliable) ranging using static scrambled time stamp (STS), where the distance and angle between the new device 100B and the current device 100A is determined. The current device 100A may perform UWB secure ranging using dynamic STS, where the distance and angle between the new device 100B and the current device 100A is determined. At 406, the current device 100A further assists a user in identifying the device. A user interface (UT)/user experience (UX) on the current device 100A can display the device (in this case, the new device 100B) towards which the current device 100A is pointed (or multiple devices with their positions relative to the current device 100A). This helps in the user identifying the correct device (in this case, the new device 100B). At 407, the new device 100B verifies that the current device 100A is within a threshold distance/angle. On-boarding is restricted, if the distance and angle between the current device 100A and the new device 100B is not within the threshold distance/angle. At, 408, if the distance and angle between the current device 100A and the new device 100B is within the threshold distance/angle, the current device 100A on-boards new device 100B by provisioning the new device 100B with information/parameters such as, but not limited to, security keys, details of existing networks, and so on. At 409, the new device 100B connects to the existing network 200.

Figure 5A:
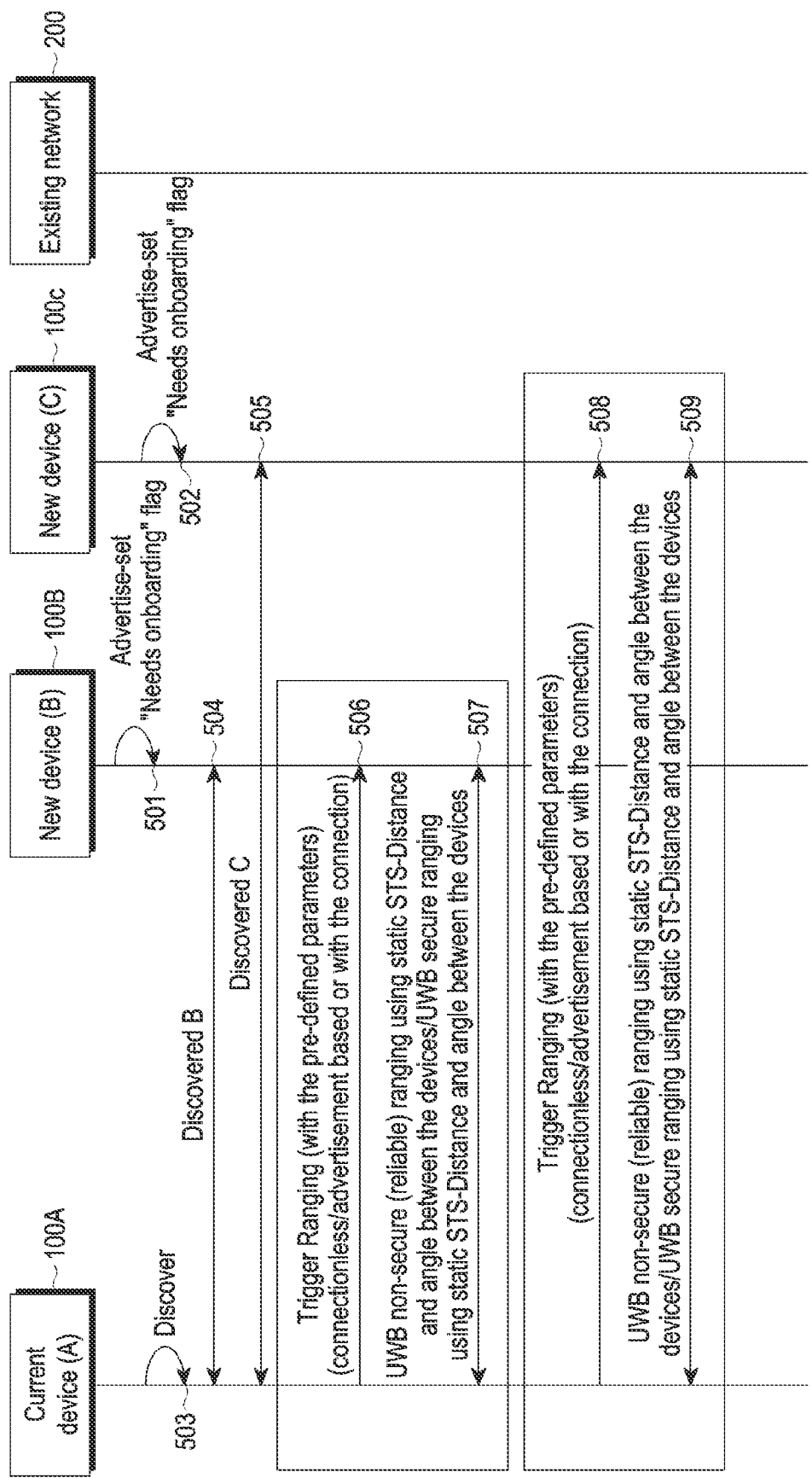
FIGS. 5A and 5B are a diagram illustrating a process of on-boarding a new device from multiple devices, according to an embodiment.
Figure 5B:
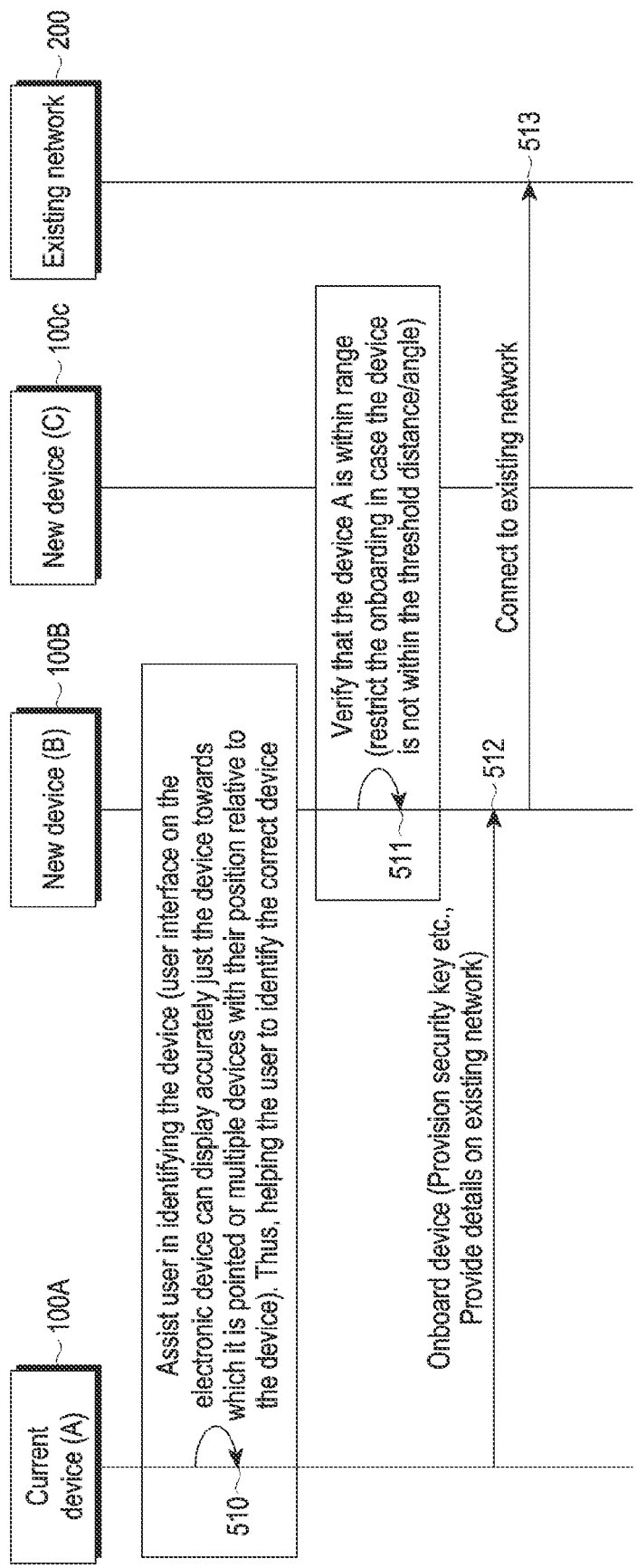

FIGS. 5A and 5B are a diagram illustrating a process of on-boarding a new device from multiple devices, according to an embodiment. The new device 100B is to be on-boarded by the current device 100A to an existing network 200. New device 100C is another device that is not to be on-boarded. At 501, the new device 100B advertises an advertisement that includes a 'needs on-boarding' flag that is set. At 502, the new device 100C also advertises an advertisement that includes a 'needs on-boarding' flag that is set. At 503-505, the current device 100A performs a discovery procedure and discovers the new device 100B and the new device 100C. At 506, the current device 100A, performs ranging based device identification and performs secure on-boarding through user/device proximity detection. The current device 100A triggers ranging with the new device 100B, using one or more pre-defined parameters or using all the parameters (which can be connectionless/advertisement based or with a connection). At 507, the current device 100A may perform UWB non-secure (reliable) ranging using static STS, where the distance and angle between the new device 100B and the current device 100A is determined. The current device 100A may perform UWB secure ranging using dynamic STS, where the distance and angle between the new device 100B and the current device 100A is determined. At 508, the current device 100A triggers ranging with the new device 100C, using one or more pre-defined parameters or using all the parameters (which can be connectionless/advertisement based or with a connection). The current device 100A triggers ranging with the new device 100C using one or more pre-defined parameters or using all the parameters (which can be connectionless/advertisement based or with a connection). At 509, the current device 100A may perform UWB non-secure (reliable) ranging using static STS, where the distance and angle between the new device 100 C and the current device 100A, respectively, are determined. The current device 100A may perform UWB secure ranging using dynamic STS, where the distance and angle between the new device 100C and the current device 100A, respectively, are determined. At 510, the current device 100A further assists a user in identifying the device. A UI/UX on the current device 100A can display the device (in this case, the new device 100B) towards which the current device 100A is pointed (or multiple devices with their positions relative to the current device 100A). This helps in the user identifying the correct device (in this case, the new device 100B). At 511, The new device 100B verifies that the current device 100A is within a threshold distance/angle. On-boarding is restricted, if the distance and angle between the current device 100A and the new device 100B is not within the threshold distance/angle. At 512, if the distance and angle between the current device 100A and the new device 100B is within the threshold distance/angle, the current device 100A on-boards the new device 100B by provisioning the new device 100B with information/parameters such as, but not limited to, security keys and details of existing networks. At 513, the new device 100B connects to the existing network 200.

Figure 6A:
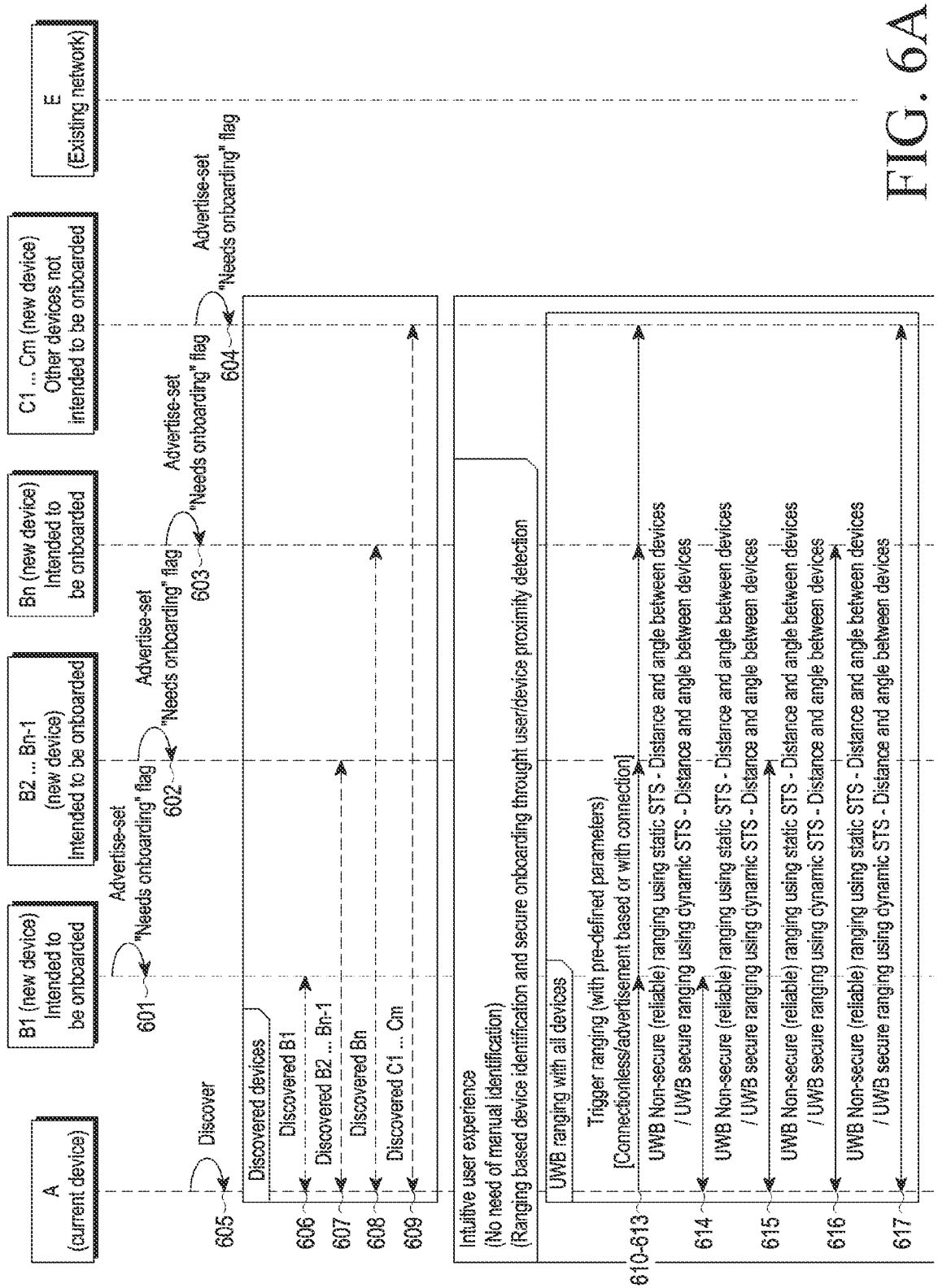
FIGS. 6A, 6B, and 6C are a diagram illustrating a process of on-boarding n new devices from n+m devices, according to an embodiment.
Figure 6B:
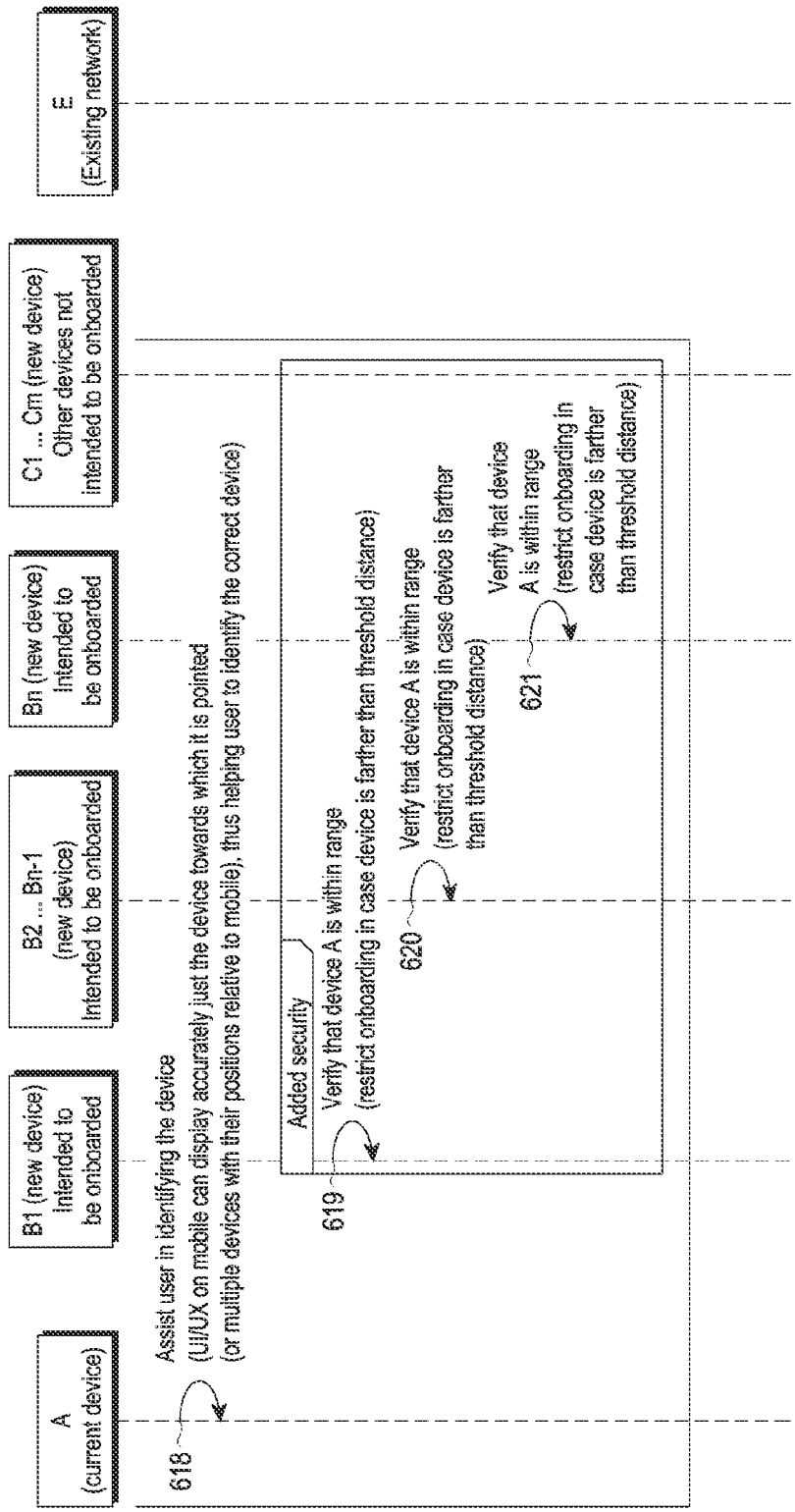
Figure 6C:
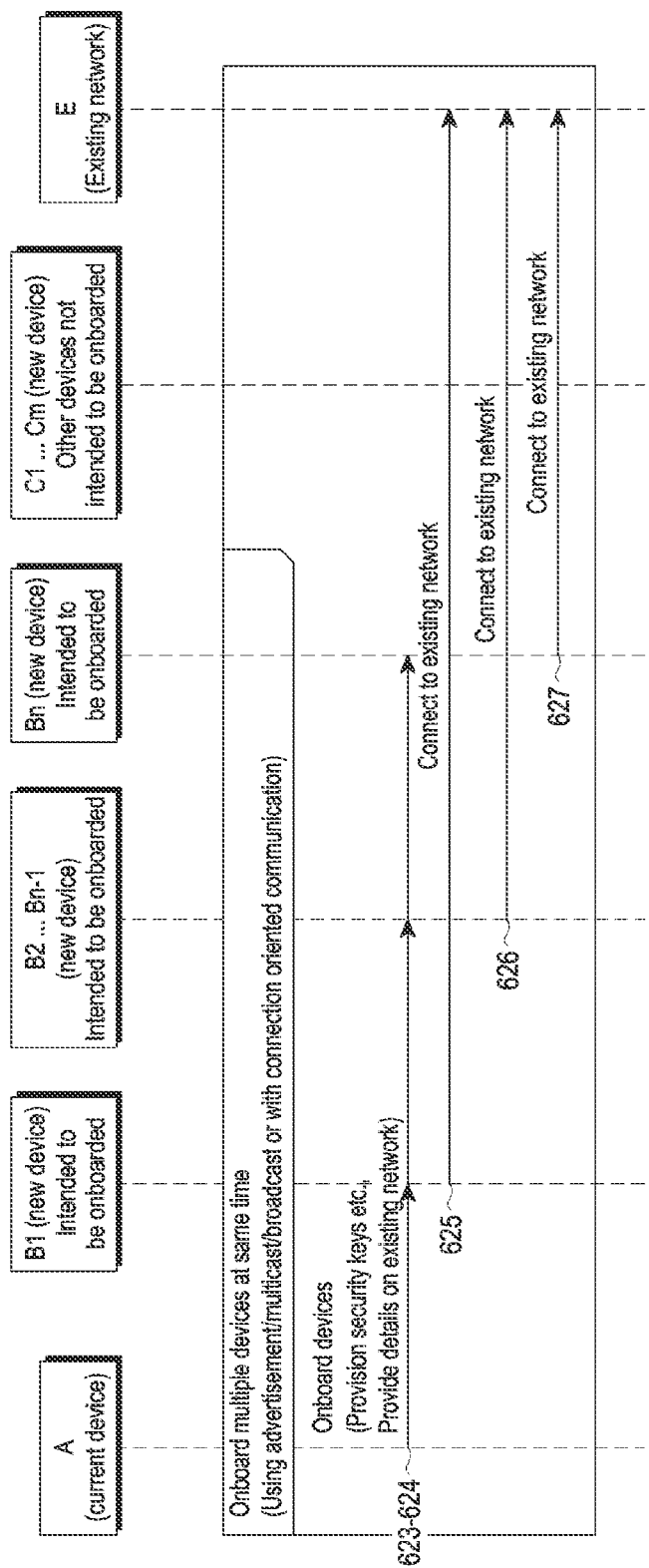

FIGS. 6A, 6B and 6C are a diagram illustrating a process of on-boarding n new devices from n+m devices, according to an embodiment. New devices B1, B2, ..., Bn−1, Bn are to be on-boarded by a current device A to an existing network E, Other devices C1, ..., Cm are not to be on-boarded. At 601, the new device B1 advertises an advertisement including a 'needs on-boarding' flag that is set. At 602, the new devices B2, ..., Bn−1 advertise an advertisement including a 'needs on-boarding' flag that is set. At 603, the new device Bn advertises an advertisement including a 'needs on-boarding' flag that is set. At 604, the other devices C1, ..., Cm advertise an advertisement including a 'needs on-boarding' flag that is set. At 605, the current device A performs a discovery procedure and discovers the new devices B1, B2, ..., Bn−1, Bn, and the other devices C1, ..., Cm, at 606-609. At 610-613, the current device A performs ranging based device identification an performs secure on-boarding through user/device proximity detection. The current device A triggers ranging with the new devices B1, B2, ..., Bn−1, Bn, and the other devices C1, ..., Cm, using one or more pre-defined parameters or using all the parameters (which can be connectionless/advertisement based or with a connection). At 614, the current device A may perform UWB non-secure (reliable) ranging using static STS, where the distance and angle between the new device B1 and the current device A is determined. The current device A may perform UWB secure ranging using dynamic STS, where the distance and angle between the new device B1 and the current device A is determined. At 615, the current device A may perform UWB non-secure (reliable) ranging using static STS, where the distance and angle between the new devices B2, ..., Bn−1 and the current device A is determined. The current device A may perform UWB secure ranging using dynamic STS, where the distance and angle between the new devices B2, ..., Bn−1 and the current device A is determined. At 616, the current device A may perform UWB non-secure (reliable) ranging using static STS, where the distance and angle between the new device Bn and the current device A is determined. The current device A may perform UWB secure ranging using dynamic STS, where the distance and angle between the new device Bn and the current device A is determined. At 617, the current device A may perform UWB non-secure (reliable) ranging using static STS, where the distance and angle between the other devices C1, ..., Cn and the current device A, respectively, are determined. The current device A may perform UWB secure ranging using dynamic STS, where the distance and angle between the other devices C1, ..., Cn and the current device A, respectively, are determined. At 618, the current device A further assists a user in identifying the devices. A UI/UX on the current device A can display the device (in this case, the new devices B1, B2, ..., Bn−1, Bn) towards which the current device A is pointed (or multiple devices with their positions relative to the current device A). This helps in the user identifying the correct device (in this case, the new devices B1, B2, ..., Bn−1, Bn). At 619, the new device B1 verifies that the current device A is within a threshold distance/angle. On-boarding is restricted, if the distance and angle between the current device A and the new device B1 is not within the threshold distance/angle. At 622, if the distance and angle between the current device A and the new device B1 is within the threshold distance/angle, the current device A on-boards the new device B1 by provisioning the new device B1 with information/parameters such as, but not limited to, security keys, details of existing networks, and so on. At 620, the new devices B2, ..., Bn−1 verify that the current device A is within a threshold distance/angle. On-boarding is restricted, if the distance and angle between the current device A and the new devices B2, ..., Bn−1 is not within the threshold distance/angle. At 623, if the distance and angle between the current device A and the new devices B2, ..., Bn−1 is within the threshold distance/angle, the current device A on-boards the new devices B2, ..., Bn−1 by provisioning the new devices B2, ..., Bn−1 with information/parameters such as, but not limited to, security keys, details of existing networks, and so on. At 621, the new device Bn verifies that the current device A is within a threshold distance/angle. On-boarding is restricted, if the distance and angle between the current device A and the new device Bn is not within the threshold distance/angle. At 624, if the distance and angle between the current device A and the new device Bn is within the threshold distance/angle, the current device A on-boards the new device Bn by provisioning the new device Bn with information/parameters such as, but not limited to, security keys, details of existing networks, and so on. B1, B2, ..., Bn−1, At 625, the new device B1 connects to the existing network E. At 626, the new devices B2, ..., Bn−1 connect to the existing network E. At 627, the new device Bn connects to the existing network E.

Figure 7:
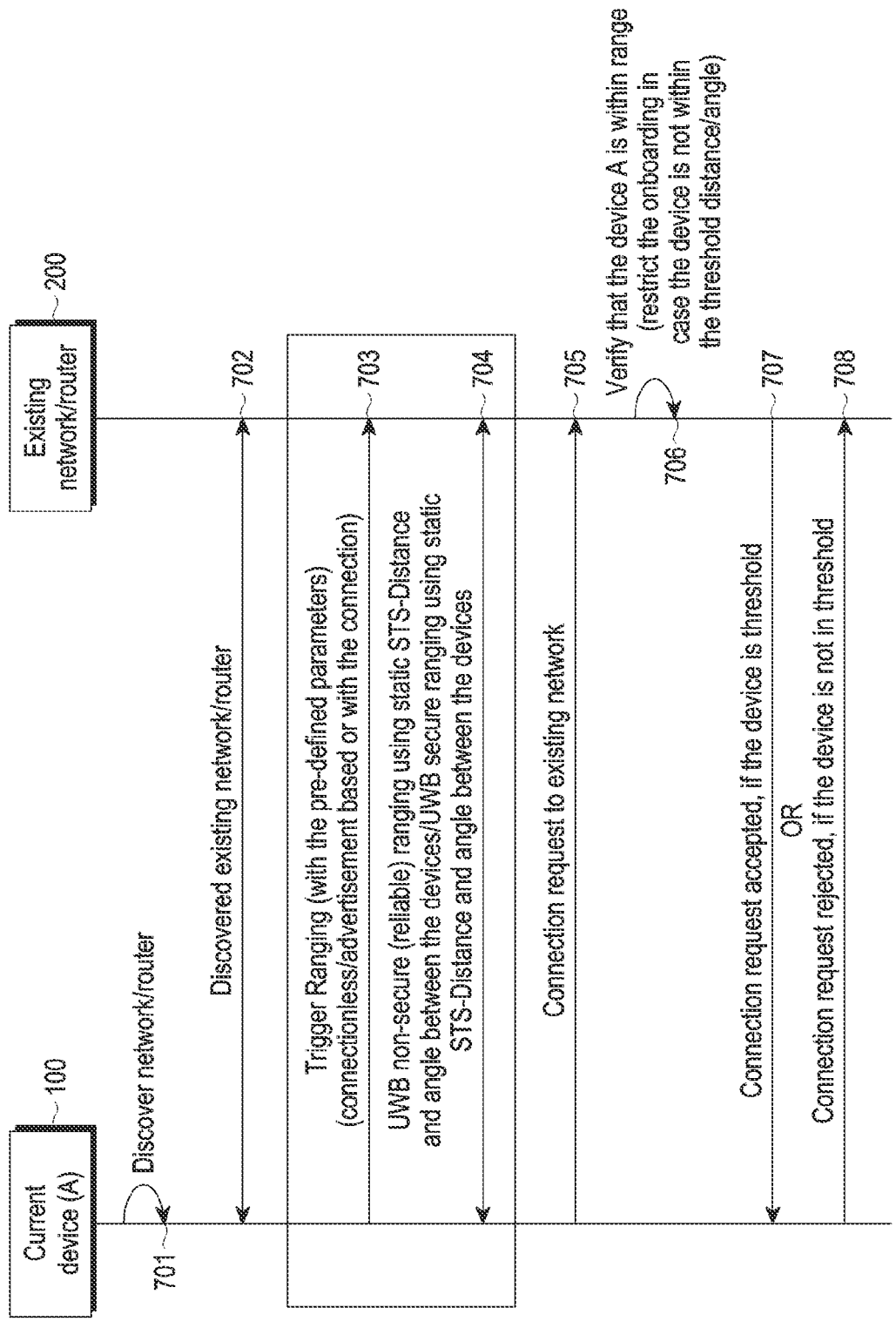
FIG. 7 is a diagram illustrating a process of enhancing security of systems/networks, according to an embodiment.

FIG. 7 is a diagram illustrating a process of enhancing security of systems/networks, according to an embodiment. Embodiments herein enhance the security of systems/networks (such as, Wi-Fi networks). For example, a new device may only be connected to a Wi-Fi access point (AP) when within the pre-defined threshold distance. Once the device has been on-boarded, the device may connect to the Wi-Fi AP from beyond the pre-defined threshold distance.

At 701, a current device 100 discovers a network/router 200. At 702, the current device 100 establishes the connection with existing network/router 200. At 703, the current device 100 triggers the ranging (with the pre-defined parameters) (connectionless/advertisement based or with the connection). At 704, the UWB non-secure (reliable) ranging may be provided using static STS-Distance and angle between the devices, or UWB secure ranging may be provided using static STS-Distance and angle between the devices. At 705, the current device 100 sends the connection request to the existing network. At 706, the network/router verifies that the current device 100 is within range. If the current device 100 is not within range, the network/router 200 restricts the on-boarding. At 707, the network/router 200 sends the connection request accepted message, if the device is in the threshold. At 8, the network/router 200 sends the connection request rejected, if the device is not in threshold range.

Figure 8:
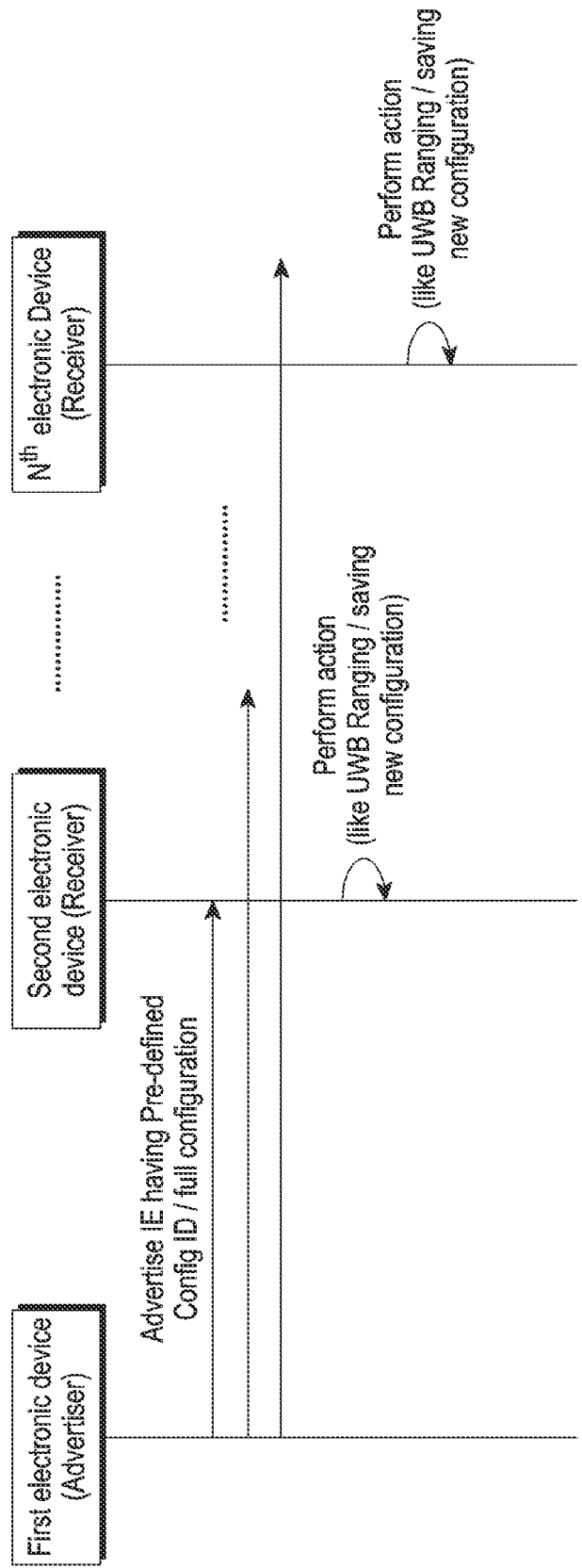
FIG. 8 is a diagram illustrating a process of advertisement of pre-defined/full configuration to multiple devices, according to an embodiment.

FIG. 8 is a diagram illustrating a of advertisement of pre-defined/full configuration to multiple devices, according to an embodiment. Advertisement data may consists of header and payload parts. The header contains information, such as a MAC address, used for routing, which can be used to identify and track the device/user. To ensure privacy this information can be encrypted, so that only the intended receiver can decrypt and understand this info, and thereby protecting privacy. The payload contains the actual information element (IE) that conveys information such as UWB configuration. To ensure privacy and security, this information can be encrypted. When strong privacy and encryption is not required, the main IE can be digitally signed, and the digital signature can be sent along with main IE as part of the payload. This ensures authenticity of information. The receiver will verify this signature before using it. For example, 2 variants of an IE for protection of advertisement data are shown in Table 1 and Table 2.

TABLE 1

Advertisement Data

| | |
|---|---|
| Encrypted Header (MAC Address etc.) | Encrypt for privacy protection. |
| Encrypted Payload - IE (UWB configuration/configuration id etc.) | Encrypt for privacy and security. |

TABLE 2

Advertisement Data

| | |
|---|---|
| Encrypted Header (MAC Address etc.) | Optionally Encrypt for privacy protection. |
| Payload IE | |
| Encrypted Main IE (UWB configuration/configuration id etc.) | Optionally Encrypt for privacy and security. |
| Digital Signature | Sign the information in Main IE, to ensure authenticity of information. Receiver will verify this signature before using it. |

Table 3 and Table 4 depict IE variants, which can be used to convey threshold/zone information for added security. The variant, as depicted in Table 4, is used to convey complex zone/threshold information that is comprised of multiple smaller zones/thresholds. Information about each such zone/threshold is conveyed using distance and angle in azimuth and inclination. The variant, as depicted in Table 4, is used for conveying simpler zone/threshold information, which is a zone around a device identified by distance, and a plus/minus angle threshold. The angle threshold may be omitted, if only distance threshold is required all around the device.

TABLE 3

On-boarding threshold/zone IE - 1

Number of zones (n)
List of zone info's (n items)
One item of Zone Info/threshold info (repeated n times)
    Distance Threshold
    Angle Threshold - azimuth start
    Angle Threshold - azimuth end TABLE 3-continued On-boarding threshold/zone IE - 1

Angle Threshold - inclination/elevation start
    Angle Threshold - inclination/elevation end

TABLE 4

On-boarding threshold/zone IE - 2

Zone Info/threshold info
    Distance Threshold
    Angle Threshold (+/−)

Table 5-Table 7 depict IEs for UWB ranging using advertisement of (pre-defined or full) configuration to multiple devices.

TABLE 5

| IEs for UWB Ranging using Advertisement of Pre-defined configuration to multiple devices | size |
|---|---|
| Num of devices | 8 bits |
| List of IE to configuration as config identifiers between UWB devices along with Device ID | variable |

TABLE 6

IE to configuration as config identifiers
between UWB devices along with Device ID size

| | |
|---|---|
| Device ID | |
| config ID | N bits |
| Number of Receivers (n) | M bits |
| List of Receiver MAC Addresses | n * size of(MAC address) |

TABLE 7

IE to configuration as full configuration
between UWB devices along with Device ID size

| | |
|---|---|
| Device ID | |
| Config Param 1, Config Param 2 . . . | N bits |
| Number of Receivers (n) | M bits |
| List of Receiver MAC Addresses | n * size of(MAC address) |

Figure 9:
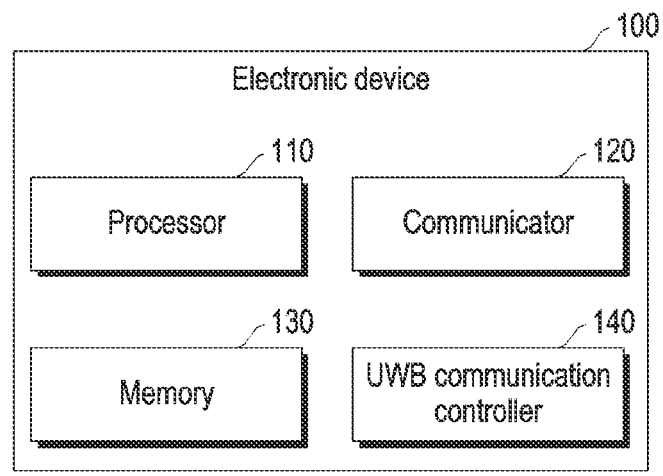
FIG. 9 is a diagram illustrating various hardware components of the electronic device, according to an embodiment.

FIG. 9 is a diagram illustrating various hardware components of an electronic device, according to an embodiment. An electronic device 100 can be, for example, but is not limited to, a laptop, a desktop computer, a notebook, a vehicle to everything (V2X) device, a smartphone, a tablet, an Internet of things (IoT) device, an immersive device, a virtual reality device, a foldable device, and the like. The electronic device 100 includes a processor 110, a communicator 120, a memory 130, and a UWB communication controller 140. The processor 110 is coupled with the communicator 120, the memory 130, and the UWB communication controller 140.

The UWB communication controller 140 discovers the at least one second electronic device to be on-boarded. The at least one second electronic device to be on-boarded is discovered by pointing towards the at least one second electronic device to be on-boarded and discovering the at least one second electronic device to be on-boarded in response to pointing.

The at least one second electronic device to be on-boarded may be discovered by pointing towards the at least one second electronic device to be on-boarded, determining that the at least one second electronic device to be on-boarded is within a predefined range. The predefined range is determined based on at least one of a distance between the first electronic device and the at least one second electronic device and an angle between the first electronic device and the at least one second electronic device. The first electronic device may discover the at least one second electronic device to be on-boarded in response to the pointing and the determination.

The at least one second electronic device to be on-boarded may be discovered by indicating a point related to the at least one second electronic device to be on-boarded and discovering the at least one second electronic device to be on-boarded in response to indicating.

The at least one second electronic device to be on-boarded is discovered by indicating a point related to the at least one second electronic device to be on-boarded, determining, by the first electronic device, that the at least one second electronic device to be on-boarded is within a predefined range. The predefined range is determined based on at least one of a distance between the first electronic device and the at least one second electronic device and an angle between the first electronic device and the at least one second electronic device. The first electronic device (100a) may discover the at least one second electronic device to be on-boarded in response to the pointing and the determination.

Further, the UWB communication controller 140 handles the communication with the at least one discovered second electronic device. The communication with the at least one discovered second electronic device may be handled by determining that the at least one discovered second electronic device is within an on-boarding range, and establishing the communication with the at least one discovered second electronic device in the UWB system based on the determination.

The communication with the at least one discovered second electronic device may be handled by configuring information to the at least one discovered second electronic device by a connectionless message, and establishing the communication with the at least one discovered second electronic device in the UWB system based on the information. The information can be, for example, but is not limited to an ownership of the electronic device, exchange of security keys for a session, identity to the electronic device, configure access to a network, perform Bluetooth™ (BT) pairing, if BT is supported, a register device, a configure cloud access, a register onto a cloud, UWB parameter configuration, and a pre-defined UWB configuration.

The broadcasted information may be encrypted before transmitting the broadcasted information, where the broadcasted information includes at least one of a header, a payload part and a digital signature, and a MAC address in the header is encrypted. The broadcasted information includes at least one of a number of zones, a list of zone information, at least one angle threshold associated with an azimuth start of the first electronic device, at least one angle threshold associated with an azimuth end of the first electronic device, at least one angle threshold associated with inclination start of the first electronic device, an angle threshold associated with inclination end of the first electronic device, at least one device identifier, a configuration identifier, a number of receiver, and a list of receiver MAC addresses.

Further, the UWB communication controller 140 may perform the secure on-boarding by protecting an information using a connectionless communication. The on-boarding communication is performed at least one of an out-of-band and in-band.

The UWB communication controller 140 may be physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor 110 may be configured to execute instructions stored in the memory 130 and to perform various processes. The communicator 120 is configured for communicating internally between internal hardware components and with external devices via one or more networks. The memory 130 also stores instructions to be executed by the processor 110. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In certain examples, a non-transitory storage medium may store data that can, over time, change (e.g., in Random Access Memory (RAM) or cache).

Further, at least one of the pluralities of modules/controller may be implemented through the AI model using a data driven controller. The data driven controller can be a ML model based controller and AI model based controller. The function associated with the AI model may be performed through the non-volatile memory, the volatile memory, and the processor 110. The processor 110 may include one or a plurality of processors. At this time, one or a plurality of processors may be a general purpose processor, such as a central processing unit (CPU), an AP, or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or AI model is provided through training or learning.

Herein, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 9 shows various hardware components of the electronic device 100, it is to be understood that other embodiments are not limited thereon. In other embodiments, the electronic device 100 may include fewer or more components. Further, the labels or names of the components are used only for illustrative purpose and does not limit the scope of the invention. One or more components can be combined to perform same or substantially similar function in the electronic device (100).

Figure 10:
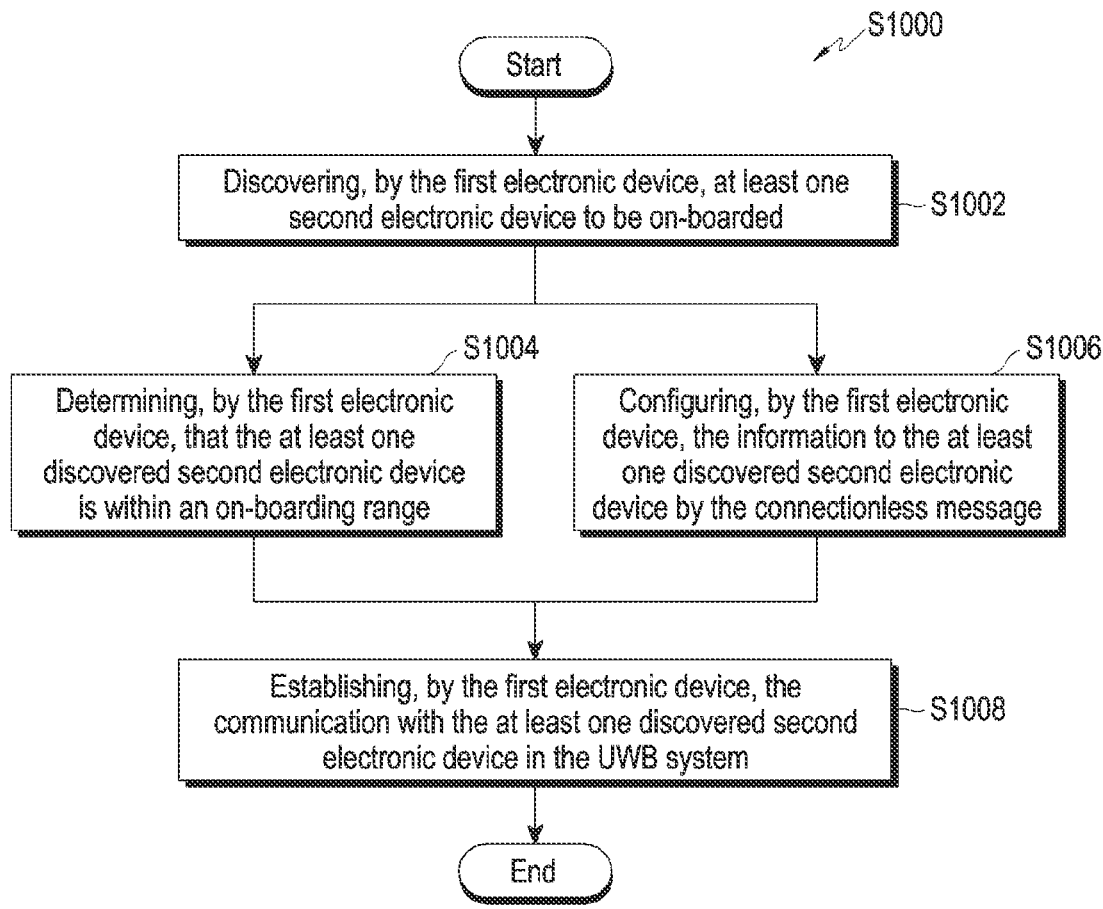
FIG. 10 and FIG. 11 are flowcharts illustrating methods for handling communication in an UWB system, according to an embodiment.
Figure 11:
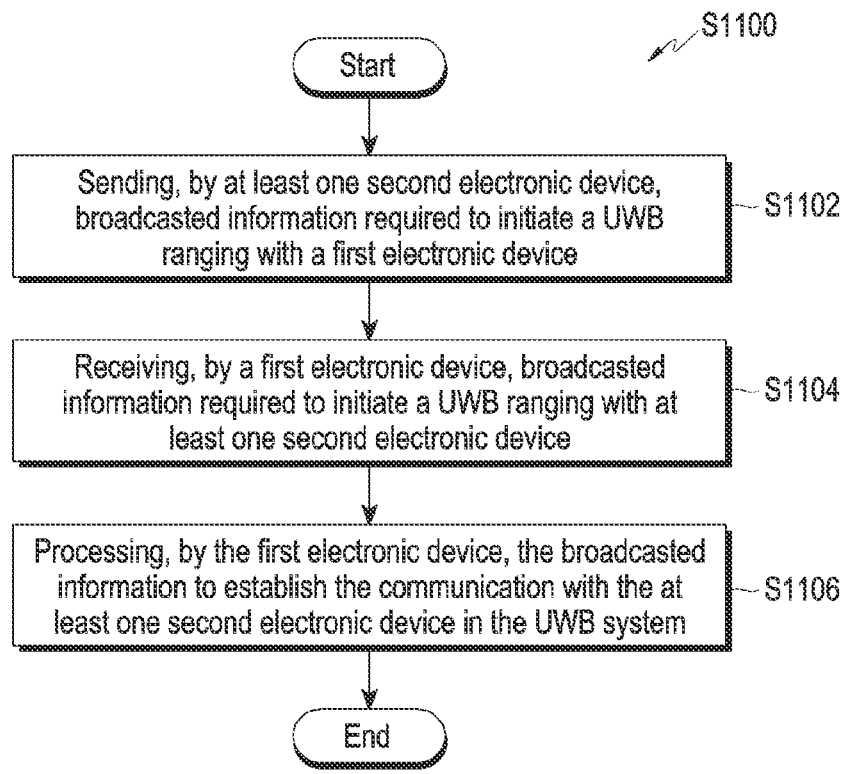

FIG. 10 and FIG. 11 are flowcharts illustrating methods for handling communication in a UWB system, according to an embodiment.

As shown in flowchart S1000 of FIG. 10, operations S1002 to S1008 are handled by the UWB communication controller 140. At S1002, the at least one second electronic device to be on-boarded is discovered by the first electronic device. At S1004, the at least one discovered second electronic device is determined to be within the on-boarding range. At S1006, the information to the at least one discovered second electronic device is configured by the connectionless message. At S1008, the communication with the at least one discovered second electronic device in the UWB system is established based on the determination.

As shown in flowchart 1100 of FIG. 11, at S1102, the at least one second electronic device sends broadcasted information required to initiate the UWB ranging with the first electronic device. At S1104, the first electronic device receives the broadcasted information required to initiate the UWB ranging with the at least one second electronic device. At S1106, the first electronic device processes the broadcasted information to establish the communication with the at least one second electronic device in the UWB system.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

What is claimed is:

1. A method for handling communication in an ultra-wideband (UWB) system, the method comprising:
    discovering, by a first electronic device, at least one second electronic device to be on-boarded;
    determining, by the first electronic device, whether the at least one second electronic device is within an on-boarding range based on at least one of a distance between the first electronic device and the at least one second electronic device or an angle between the first electronic device and the at least one second electronic device;
    configuring, by the first electronic device, information to the at least one second electronic device by a connectionless message based on the determination for the at least one second electronic device; and
    establishing, by the first electronic device, the communication with the at least one second electronic device in the UWB system based on the configuration of the information to the at least one second electronic device,
    wherein the on-boarding range is a value configured by the first electronic device.

2. The method as claimed in claim 1, wherein the information comprises at least one of an ownership of the at least one second electronic device, exchange of security keys for a session, identity to the at least one second electronic device, configured access to a network, Bluetooth (BT) pairing, if BT is supported, a register device, a configured cloud access, a register onto a cloud, UWB parameter configuration, and a pre-defined UWB configuration.

3. The method as claimed in claim 1, wherein the information is encrypted before transmitting the information, the information comprises at least one of a header, a payload part, and a digital signature, and a medium access control (MAC) address in the header is encrypted.

4. The method as claimed in claim 1, wherein the information comprises at least one of a number of zones, a list of zone information, at least one angle threshold associated with an azimuth start of the first electronic device, at least one angle threshold associated with an azimuth end of the first electronic device, at least one angle threshold associated with inclination start of the first electronic device, an angle threshold associated with inclination end of the first electronic device, at least one device identifier, a configuration identifier, a number of receiver, and a list of receiver MAC addresses.

5. The method as claimed in claim 1, wherein discovering the at least one second electronic device to be on-boarded comprises:
    pointing, by the first electronic device, towards the at least one second electronic device to be on-boarded; and
    discovering, by the first electronic device, the at least one second electronic device to be on-boarded in response to pointing.

6. The method as claimed in claim 1, wherein discovering the at least one second electronic device to be on-boarded comprises:
    pointing, by the first electronic device, towards the at least one second electronic device to be on-boarded;
    determining, by the first electronic device, that the at least one second electronic device to be on-boarded is within a predefined range, wherein the predefined range is determined based on at least one of a distance between the first electronic device and the at least one second electronic device and an angle between the first electronic device and the at least one second electronic device; and
    discovering, by the first electronic device, the at least one second electronic device to be on-boarded in response to the pointing and the determination.

7. The method as claimed in claim 1, wherein discovering the at least one second electronic device to be on-boarded comprises:

indicating, by the first electronic device, a point related to the at least one second electronic device to be on-boarded; and discovering, by the first electronic device, the at least one second electronic device to be on-boarded in response to indicating.

8. The method as claimed in claim 1, wherein discovering the at least one second electronic device to be on-boarded comprises:

indicating, by the first electronic device, a point related to the at least one second electronic device to be on-boarded;

determining, by the first electronic device, that the at least one second electronic device to be on-boarded is within a predefined range, wherein the predefined range is determined based on at least one of a distance between the first electronic device and the at least one second electronic device and an angle between the first electronic device and the at least one second electronic device; and discovering, by the first electronic device, the at least one second electronic device to be on-boarded in response to the pointing and the determination.

9. The method as claimed in claim 1, further comprising performing, by the first electronic device, a secure on-boarding by protecting an information using a connectionless communication.

10. The method as claimed in claim 1, wherein the on-board communication is performed out-of-band or in-band.

11. A method for handling communication in an ultra-wideband (UWB) system, the method comprising:

receiving, by a first electronic device, broadcasted information required to initiate a UWB ranging with at least one second electronic device; and processing, by the first electronic device, the broadcasted information to establish the communication with the at least one second electronic device in the UWB system, wherein the broadcasted information comprises a number of zones, a list of zone information, device identifier, and a configuration identifier.

12. The method as claimed in claim 11, wherein the broadcasted information is encrypted before transmission, the broadcasted information comprises at least one of a header, a payload part, and a digital signature, and a medium access control (MAC) address in the header is encrypted.

13. The method as claimed in claim 11, wherein the broadcasted information comprises at least one angle threshold associated with an azimuth start of the first electronic device, wherein the broadcasted information comprises at least one angle threshold associated with an azimuth end of the first electronic device, at least one angle threshold associated with inclination start of the first electronic device, an angle threshold associated with inclination end of the first electronic device, and wherein the broadcasted information comprises a number of receiver, and a list of receiver MAC addresses.

14. The method as claimed in claim 11, wherein processing the broadcasted information to establish the communication with the second electronic device in the UWB system comprises:

decrypting, by the first electronic device, the broadcasted information; and using, by the first electronic device, the decrypted broadcasted information to establish the communication with the second electronic device in the UWB system.

15. A first electronic device for handling communication in an ultra-wideband (UWB) system, comprising:

a processor;

a memory; and a UWB communication controller, coupled with the processor and the memory, and configured to:

discover at least one second electronic device to be on-boarded;

determine, by the first electronic device, whether the at least one second electronic device is within an on-boarding range based on at least one of a distance between the first electronic device and the at least one second electronic device or an angle between the first electronic device and the at least one second electronic device;

configure, by the first electronic device, information to the at least one second electronic device by a connectionless message based on the determination for the at least one second electronic device; and establish the communication with the at least one second electronic device in the UWB system based on the configuration of the information to the at least one second electronic device, wherein the on-boarding range is a value configured by the first electronic device.

16. The first electronic device as claimed in claim 15, wherein the information is encrypted before transmitting the information, the information comprises at least one of a header, a payload part, and a digital signature, and a medium access control (MAC) address in the header is encrypted.

17. The first electronic device as claimed in claim 15, wherein the information comprises at least one of a number of zones, a list of zone information, at least one angle threshold associated with an azimuth start of the first electronic device, at least one angle threshold associated with an azimuth end of the first electronic device, at least one angle threshold associated with inclination start of the first electronic device, an angle threshold associated with inclination end of the first electronic device, at least one device identifier, a configuration identifier, a number of receiver, and a list of receiver MAC addresses.

18. A first electronic device for handling communication in an ultra-wideband (UWB) system, comprising:

a processor;

a memory; and a UWB communication controller, coupled with the processor and the memory, and configured to:

receive broadcasted information required to initiate a UWB ranging with at least one second electronic device; and process the broadcasted information to establish the communication with the at least one second electronic device in the UWB system based on the broadcasted information, wherein the broadcasted information comprises a number of zones, a list of zone information, device identifier, and a configuration identifier.

19. The first electronic device as claimed in claim 18, wherein the broadcasted information is encrypted before transmission, the broadcasted information comprises at least one of a header, a payload part, and a digital signature, and a medium access control (MAC) address in the header is encrypted.

20. The first electronic device as claimed in claim 18, wherein the broadcasted information comprises at least one angle threshold associated with an azimuth start of the first electronic device, wherein the broadcasted information comprises at least one angle threshold associated with an azimuth end of the first electronic device, at least one angle threshold associated with inclination start of the first electronic device, an angle threshold associated with inclination end of the first electronic device, and wherein the broadcasted information comprises a number of receiver, and a list of receiver MAC addresses.

\* \* \* \* \*